April 22, 1930.  H. DE PISTOYE  1,755,815

ALTERNATING CURRENT ELECTRIC MACHINE

Filed March 30, 1926

Patented Apr. 22, 1930

1,755,815

UNITED STATES PATENT OFFICE

HENRI DE PISTOYE, OF PARIS, FRANCE

ALTERNATING-CURRENT ELECTRIC MACHINE

Application filed March 30, 1926, Serial No. 98,452, and in Belgium April 24, 1925.

This invention relates to alternating current electric machines having a phase-advancing device, and more particularly to asynchronous machines of this type.

The main object of this invention is to produce phase-advancing currents by more satisfactory means than those hitherto known in connection with moderately powered machines.

The invention comprises a machine having a phase-advancing device, in which a main machine (generally asynchronous) and an exciter are combined within one magnetic circuit, the exciter being a commutator frequency-converter having a different number of poles than the main machine, and being of the Maurice Leblanc type (described in "L'Eclairage Electrique" of the 28th July, 1900) or of the Boucherot type (French Patents No. 284832 dated 11th January, 1899, and No. 285083 dated 18th January, 1899) or of any analogous type. The combining of the two machines within one magnetic circuit is rendered possible by providing special means for preventing mutual induction between the windings of the main machine and those of the frequency converter. The invention consists essentially in the utilization of a commutator frequency converter having a different number of poles than the main machine and in uniting the magnetic circuit of the converter with that of the main machine. The accompanying drawings comprise the following figures:

Figure 1:
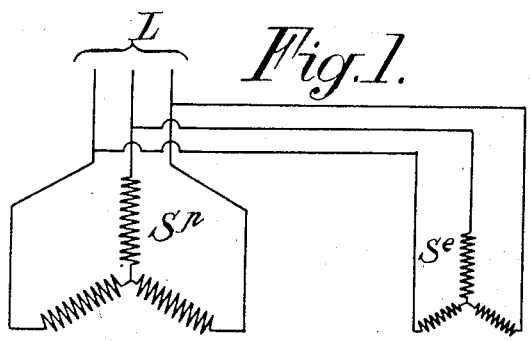
Figure 1 is a diagram of connections of a machine with phase-advancing device arranged in accordance with the invention.

The principle of excitation by frequency converters of the Leblanc and Boucherot type may be briefly summarized as follows: An electric main L is connected (as shown in Figure 1) to the stator $S^p$ of the main machine and also to the stator $S^e$ of the exciter, the latter stator carrying an ordinary multiphase winding. The rotor $R^e$ of the exciter is of a particular type and comprises a commutator, the arrangement of which (as a rule) does not correspond to the number of poles of the exciter windings. This commutator collects the currents used for exciting the main rotor $R^p$. These currents are low-frequency currents if the exciter is connected to an asynchronous machine, or direct current if the exciter operates in connection with a synchronous machine. Let $p^p$ be the number of the pairs of poles of the main machine; $p^e$ the number of the pairs of poles of the exciter and $p^c$ the number of the pairs of poles of the commutator. The equation showing the possible relations between these three terms is (in both Leblanc and Boucherot type exciters): $p^p = \pm p^e \pm p^c$.

Figure 2:
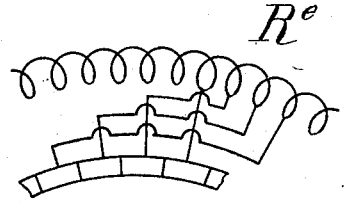
Figures 2 and 3 illustrate two known methods of connecting the windings of the rotor of a Maurice Leblanc exciter and its commutator.
Figure 3:
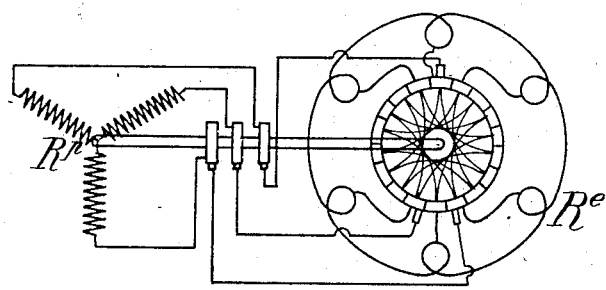

In the Leblanc exciter the winding of the rotor $R^e$ is arranged as on an ordinary direct current machine having twice $p^e$ poles. The commutator comprises a number of laminations corresponding to twice $p^c$ poles. In the case that the combination $p^p = p^e + p^c$ is to be materialized, the field of the exciter must rotate in the direction of motion of the rotor and the connections between the armature windings of the exciter and the commutator must be reversed as shown in Figure 2. In the case of the desired materialization of the relation $p^p = p^e - p^c$, the field of the exciter must still rotate in the direction of motion of the armature, but the connections must not be reversed and must be direct connections as in Figure 3. In the case of the materialization of the relation $p^p = p^c - p^e$, the field of excitation must rotate in a direction opposite to that of the motion of the armature and the connections must not be reversed. The connections shown in Fig. 1 correspond to this last case, the values shown corresponding to $p^p = 2$, $p^c = 3$, and $p^e = 1$. One or the other of these three combinations may be used with Leblanc exciters in accordance with the case to be dealt with.

Figure 7:
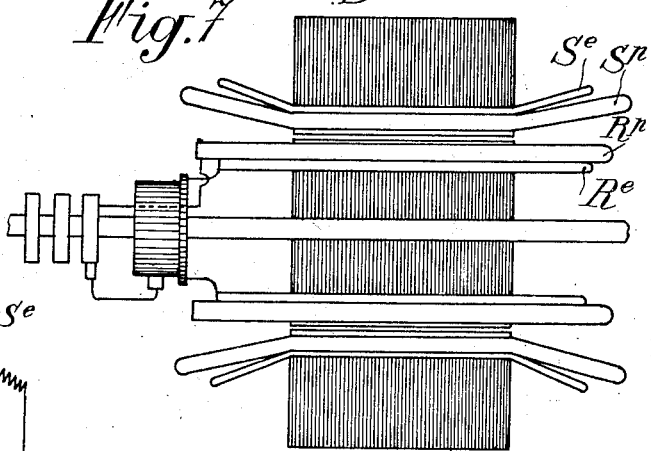
Fig. 7 is a diagrammatic section of one form of the invention taken on the axis of the rotor.

In the Boucherot type of exciter the winding is a very special one, as the number of turns in a section of winding between two adjacent laminations varies according to a sinusoidal system disclosed in Boucherot's French patent specifications Nos. 284852 and 285083. The relative directions of motion of the main field and of the excitation field are the same as for the Leblanc arrangement. In the machine with phase-advancing device according to the present invention the two magnetic circuits of the main machine and of the exciter are not separated but are united into one (Fig. 7), the method of arranging windings and the choice of the number of poles $2p^p$ and $2p^e$ being such that there is no mutual induction between the windings of the main machine and the exciter. The general diagram of connections remains as in Figure 1.

According to the invention, various steps, resorted to in other circumstances, may be applied to prevent mutual induction between the main and the exciter windings. These steps may be: shortening or lengthening the throw; star-coupling the phases; coupling the windings of the same phase in series or in parallel-series; using series or parallel-series connections for the commutator windings; using sections, having two or more turns suitably displaced relatively to one another; or another suitable step.

It is generally advantageous to feed the excitation winding $S^e$ at low voltage by connecting it either to a few turns of the main winding or to an auxiliary winding having fewer turns than the main winding.

Some of the advantages of the machine according to this invention are that the stator is fed off the electric main; that starting is not attended by any difficulty in commutation; and that phase-advancing takes place even on no load. No other known machine in which the exciter is combined with the main machine yields these three advantages simultaneously.

Figure 4:
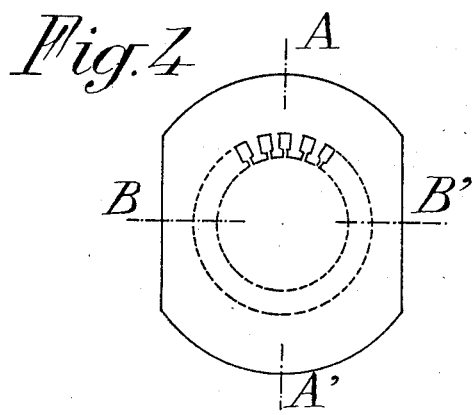
Figures 4 and 5 illustrate two stator laminations according to the present invention.
Figure 5:
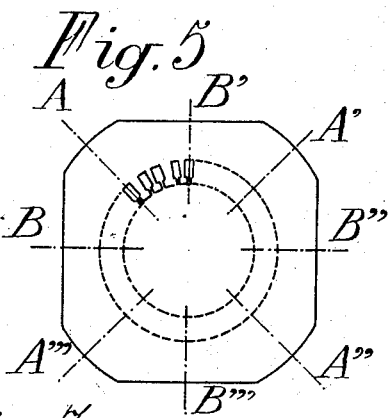

A variable core section may be used in the construction of the stator, so as to conform with the maximum flux traversing the various sections of the core and of the teeth of the stator which, in this special form of machine, is variable. Thus with reference to $p^p=2$, $p^e=4$, $p^c=2$ this flux varies from a maximum in the two diametrically opposite sections A and $A^1$ (Figure 4) to a minimum in the two sections B and $B^1$ disposed at 90° to those just mentioned. In this case the laminations may, therefore, be shaped as shown in Fig. 4. When it is desired to make $p^p=6$, $p^e=2$, $p^c=4$ there will be four zones of maximum and four of minimum flux and the laminations should therefore be shaped as shown in Figure 5. The width of the teeth of the stator may likewise be varied in the zones of maximum and minimum induction.

The machine according to this invention may be used in various ways, e. g. as a motor or as a single-phase, two-phase, three-phase, synchronous or asynchronous generator.

Figure 6:
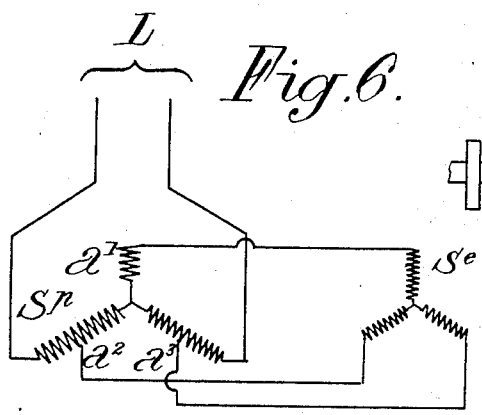
Figure 6 is the diagram of connections of a stator of a machine according to this invention arranged for single phase current feed.

When the machine according to the invention is working as a synchronous machine only two sets of brushes (one positive and the other negative) are generally disposed on the commutator. When working on single-phase current, only the main winding of the stator $S^p$ is single-phased, all the other windings remaining multi-phased as shown by way of example in the diagram of connections of Figure 6 in which the excitation winding $S^e$ is connected at $a^1, a^2, a^3$ to a three-phase auxiliary winding partially combined with the main winding.

I claim:—

1. In an alternating current dynamo electric machine, the combination of a main electric machine having a stator and a rotor winding, and a commutator frequency convertor adapted to function as a phase advancing device and having a different number of poles than the main machine, said main machine and said frequency convertor being arranged so as to form a single magnetic circuit, said frequency convertor comprising a stator winding coupled to the stator winding of the main machine, a single rotor winding, a commutator, conductors leading from said single rotor winding to the commutator, a plurality of brushes mounted in frictional relation to said commutator, and conductors leading from said brushes to the rotor winding of the main machine, the rotor and stator windings of the main machine and the frequency convertor being connected so as to prevent the disturbing effects due to the difference in the number of poles of the main machine and the frequency convertor.

2. In an alternating current dynamo electric machine, the combination of a main electric machine having a stator and a rotor winding, and a commutator frequency convertor adapted to function as a phase advancing device and having a different number of poles than the main machine, said main machine and said frequency convertor being arranged so as to form a single magnetic circuit, said frequency convertor comprising a stator winding coupled to the stator winding of the main machine, a single rotor winding of the direct current type, a commutator, a plurality of conductors connecting a plurality of points on said direct-current type rotor winding to a corresponding number of segments on said commutator, a plurality of brushes mounted in frictional relation to said commutator, and conductors leading from said brushes to the rotor winding of the main machine, the rotor and the stator windings of the main machine and of the frequency convertor being connected so as to prevent the disturbing effect due to the difference in the number of poles of the main machine and the frequency convertor.

3. In an alternating current dynamo electric machine, the combination of a main electric machine having a stator and a rotor winding, a commutator frequency convertor adapted to function as a phase-advancing device and having a different number of poles than the main machine, said main machine and said frequency convertor being arranged so as to form a single magnetic circuit, said frequency convertor comprising a stator winding coupled to the stator winding of the main machine by means of an auxiliary winding, said auxiliary winding having the same number of poles as the main stator winding and having a lesser number of turns than that of the stator winding of the main machine, a single rotor winding, a commutator, conductors leading from said single rotor winding to the commutator, a plurality of brushes mounted in frictional relation to said commutator, and conductors leading from said brushes to the rotor winding of the main machine, the rotor and stator windings of the main machine and of the frequency convertor and the auxiliary winding being connected so as to prevent the disturbing effects due to the difference in the number of poles of the main machine and the frequency convertor.

4. In combination with the machine defined in claim 1, a metal core adapted to carry the stator windings of both the main machine and the frequency convertor, said metal core having a section presenting varying radial dimensions.

In testimony whereof I have hereunto set my hand.

HENRI DE PISTOYE.